US011409774B2

(12) United States Patent
Chaintron et al.

(10) Patent No.: US 11,409,774 B2
(45) Date of Patent: Aug. 9, 2022

(54) TESTING CLIENT-SIDE RENDERING CAPABILITIES

(71) Applicant: Apple Inc., Cupertino, CA (US)

(72) Inventors: Julien Chaintron, San Francisco, CA (US); Jason K. Aftosmis, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/172,449

(22) Filed: Feb. 10, 2021

(65) Prior Publication Data

US 2021/0191959 A1 Jun. 24, 2021

Related U.S. Application Data

(63) Continuation of application No. 16/750,936, filed on Jan. 23, 2020, now Pat. No. 10,929,444, which is a continuation of application No. 15/991,607, filed on May 29, 2018, now Pat. No. 10,579,650.

(51) Int. Cl.
*G06F 16/29* (2019.01)
*G01C 21/00* (2006.01)

(52) U.S. Cl.
CPC ........... *G06F 16/29* (2019.01); *G01C 21/005* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 2008/0235566 A1 | 9/2008 | Carlson et al. |
| 2013/0321456 A1 | 12/2013 | Hultquist et al. |
| 2015/0188977 A1 | 7/2015 | Berry et al. |
| 2015/0366487 A1 | 12/2015 | Ryabov et al. |
| 2015/0378968 A1 | 12/2015 | Varadarajan |
| 2017/0235537 A1 | 8/2017 | Liu et al. |
| 2018/0232352 A1 | 8/2018 | Fulford et al. |
| 2019/0182469 A1 | 6/2019 | Sakakima |

*Primary Examiner* — James A Thompson
(74) *Attorney, Agent, or Firm* — Invoke

(57) ABSTRACT

In some implementations, a computing device can test the client-side rendering capabilities of a map module running on a computing device. For example, the map module can include a test module that sends test data to a rendering module of the browser. The rendering module can render the test data into a rendering context based on the test data. The test module can compare the pixel data in the rendering context to expected pixel data to determine whether the rendering module is capable of accurately rendering an image based on the test data. If the rendering module is capable of accurately rendering the rendering context based on the test data, the map module can be configured to perform client-side rendering of images. For example, the map module can be configured to perform client-side rendering of map data based on map data received from a map server.

20 Claims, 9 Drawing Sheets

TESTING CLIENT-SIDE RENDERING CAPABILITIES

INCORPORATION BY REFERENCE; DISCLAIMER

Each of the following applications hereby incorporated by reference: application Ser. No. 16/750,936 filed on Jan. 23, 2020; application Ser. No. 15/991,607 filed on May 29, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to rendering images on a computing device.

BACKGROUND

Mobile devices often come with navigation features, such as mapping and navigation software. Typically, a map server will render an image of a map based on map data and send the map image to a navigation application (e.g., specialized navigation application, web browser, map application, etc.) on the mobile device for presentation on a display of the mobile device. The map rendering is typically performed at the map server because, while all navigation applications can display raster tiles (e.g., rendered images) from the map server nicely, some navigation applications and/or mobile device are not able to render map data at the mobile device (e.g., with the GPU or CPU of the mobile device). Moreover, rendering the map image on the server can cause delays in presenting the map on the mobile device and can reduce the responsiveness of the navigation application on the mobile device. Thus, client-side rendering of map images is preferable.

Typically, client-side rendering capabilities are determined based on capabilities reported by the mobile device. For example, a navigation application running on the mobile device can report various navigation application and/or device characteristics that can be used to determine whether the mobile device and/or navigation application is capable of accurately rendering map data. However, the reported capabilities may be incorrect or may not provide a good enough understanding of the rendering capabilities of the mobile device and/or navigation application. Thus, a reliable mechanism for testing the rendering capabilities of a mobile device is needed.

SUMMARY

In some implementations, a computing device can test the client-side rendering capabilities of a map module of a navigation application running on a computing device. For example, the map module can include a test module that sends test data for performing a rendering test to the rendering module. The rendering module can render image data based on the test data. The test module can compare the rendered image data to expected image data to determine whether the rendering module is capable of accurately rendering an image based on the test data. If the rendering module is capable of accurately rendering an image based on the test data, the map module can be configured to perform client-side rendering of images. For example, the map module can be configured to perform client-side rendering of map images based on map data received from a map server.

Particular implementations provide at least the following advantages. By rendering map data on the client device, the map module can adjust or modify the image data (e.g., rendering context data) in response to user input without incurring network delays inherent in obtaining map images and/or updated map images from a server device. Moreover, since the mobile device does not have to communicate with a server to obtain a map image and/or update a map image, the amount of network data transmitted between the mobile device and the server device can be reduced. Additionally, by rendering map data on client device, the processing burden of rendering maps from map data can be distributed across millions of mobile devices instead of being performed by a few server devices. By rendering map data on the client device, the map module can process different layers of map data independently in response to user input. For example, base layer map data may be rendered separately from label data so that when the map is rotated, map labels can be oriented such that a user can easily read the labels. This can improve the efficiency with which a user can use and interact with a navigation application or map presented by the map module.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
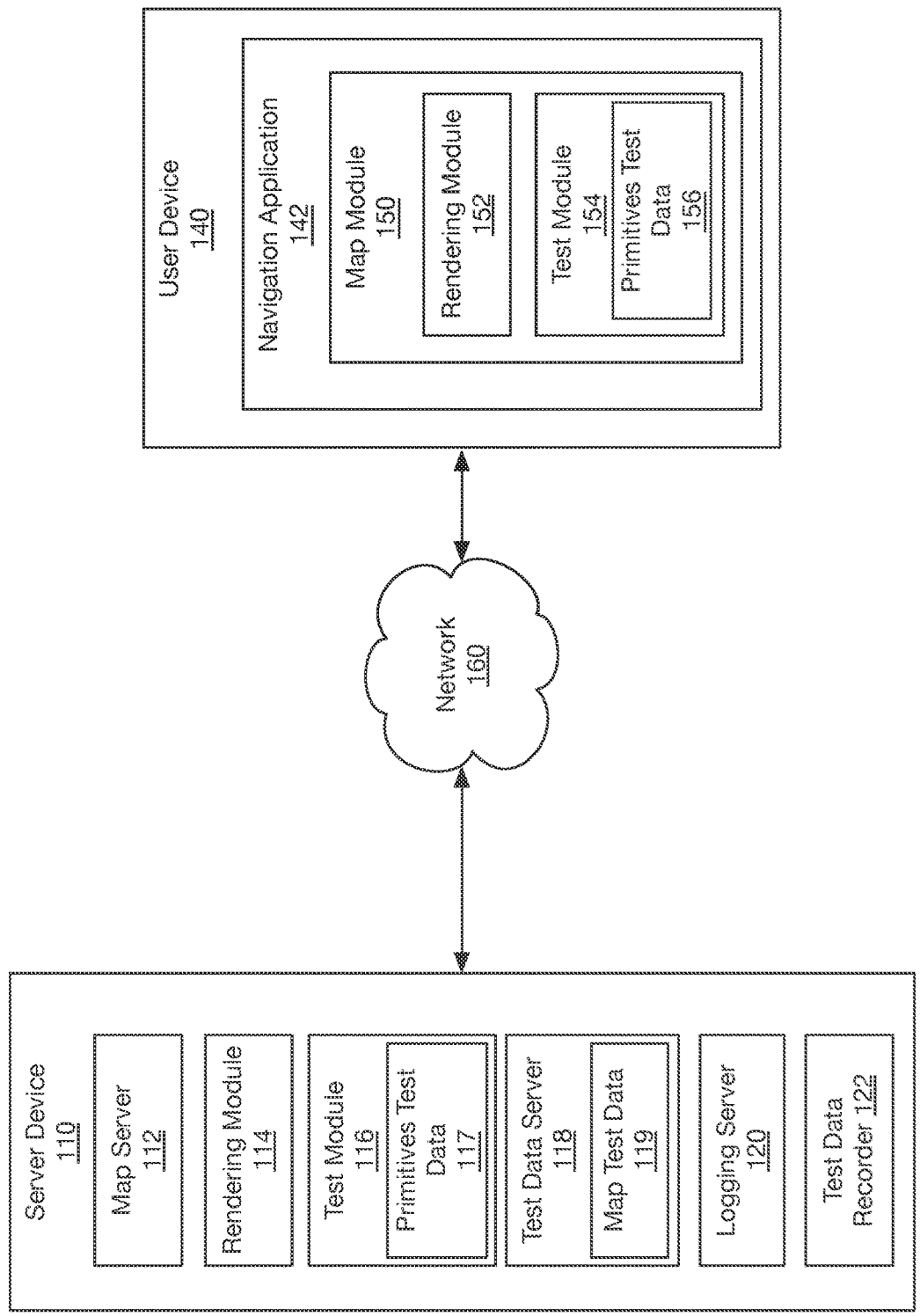
FIG. 1 is a block diagram of an example system for testing client-side rendering capabilities.

FIG. 1 is a block diagram of an example system 100 for testing client-side rendering capabilities. The description that follows describes testing client-side rendering capabilities in the context of rendering map data (e.g., maps, road segments, labels, other map features, etc.) into map images for presentation on a user device. However, the features described herein for testing client-side rendering capabilities could be used to test the capability of the user device, or any computing device, to render any type of source data into a corresponding image, rendering context, or image data. In some implementations, system 100 can test the rendering capabilities of the graphics processing unit (GPU) of the user device to determine if the GPU is capable of consistently, accurately, and quickly rendering map data into corresponding map images.

For example, a rendering module on the user device can use the GPU (or CPU) of the user device to generate or render a map image in a rendering context based on map data. A rendering context can be a data structure that stores rendered pixel data for display on a computing device. A rendering module can render source data (e.g., map data) into the rendering context by storing pixel data at appropriate locations within the rendering context. The rendering context can be displayed or presented on the computing device when the rendering context (e.g., one of many rendering contexts) becomes the active or current rendering context. When the rendering context is not the active or current context being displayed on the computing device, the rendering context can be stored as a data structure in memory on the computing device. For example, the client-side rendering test features described herein can render map data into a rendering context while the rendering context is not the active or current context on the user device. Thus, the map images generated by the test features and/or modules described herein may not be presented on a display of the user device when rendered as part of a rendering test. Moreover, because the map image or map image data is rendered or generated in the rendering context, the terms rendering context, map image, rendered data, etc., may be used interchangeably in the descriptions that follow.

In some implementations, system 100 can include server device 110. For example, server device 110 can be a computing device accessible by a client device (e.g., user device 140) through network 160 (e.g., wide area network, local area network, cellular data network, the Internet, etc.). Server device 110 can correspond to a single computing device. Server device 110 can correspond to multiple computing devices. When server device 110 corresponds to multiple computing devices, the modules and software servers of server device 110 represented on FIG. 1 can be distributed in any arrangement across the multiple computing devices. For example, map server 112, rendering module 114 and test module 116 can reside on one server device. Test data server 118 can reside on another server device. Logging server 120 can reside on yet another computing device. However, for simplicity, all of the server-side modules and software servers are represented in FIG. 1 in server device 110.

In some implementations, server device 110 can include map server 112. For example, map server 112 can be a software server running on server device 110 that serves map data (e.g., map source data, vector tiles, icons, shields, etc.) to other software modules, software servers, server devices, and/or client devices. Map server 112 can receive a request for map data corresponding to a specific geographic region (e.g., as defined by map configuration data), obtain the map data from a map database, and send the map data to the requesting process and/or device. For example, the map data served by map server 112 can be un-rendered map data (e.g., vector tiles, not images, not raster tiles) that defines various map features, layers, elements of the geographic region.

In some implementations, server device 110 can include rendering module 114. For example, rendering module 114 can be a software module configured to render map data into map images. Rendering module 114 can be configured to render map data into map images using the host device's CPU (central processing unit) and/or the host device's GPU (graphics processing unit). For example, rendering module 114 can be configured to render map data received from map server 112 using the CPU and/or GPU of server device 110. When installed on a client device (e.g., user device 140), the rendering module can be configured to render map data received from map server 112 using the CPU and/or GPU of the client device.

In some implementations, server device 110 can include test module 116. For example, test module 116 can be a software module configured to test the map data rendering capabilities of rendering module 114. Test module 116 can be configured to perform a primitives rendering test ("primitives test") of rendering module 114 using primitives test data 117 (e.g., not map data) configured to test specific capabilities of rendering module 114. For example, primitives test data 117 can include data that tests the capabilities of the GPU of the host device with respect to drawing primitives (e.g., labels, lines, polygons, specific types of shapes, etc.), as described further below.

Test module 116 can be configured to perform a map data test using real map data to determine whether rendering module 114 can accurately render a map image based on the real map data. For example, test module 116 can send map configuration data (e.g., location, zoom level, style, etc.) to rendering module 114. Rendering module 114 can obtain map data from map server 112 for a geographic region corresponding to the location in the map configuration data that includes a variety of map features that will test the rendering capabilities of rendering module 114. Rendering module 114 can render a map image based on the obtained map data. The map image can be, for example, an expected image (e.g., reference image, reference data) that can be compared to map data test results obtained at a client device to determine whether the rendering module on the client device is capable or rendering an accurate image based on the obtained map data. For example, if the client rendered map data test results are similar enough to the server rendered map image (e.g., expected image, expected result), then the test module can determine that the client has passed the map data test and is capable of client-side rendering.

In some implementations, server device 110 can include test data server 118. For example, test data server 118 can be a software server that manages and serves map test data to client devices so that the test module and rendering module on the client devices can perform map data tests. For example, when test module 116 on server device 110 performs a map data test, test module 116 can receive an image that was rendered by rendering module 114 as part of the test. Test module 116 can send the image (e.g., expected image, reference data) generated from the map data to test data server 118. Test data recorder 122 (described below) can send the map data used for the test to test data server 118. Test data server 118 can store the map data and the reference data as map test data 119. When the rendering capabilities of a client device are tested, the client device can obtain map test data 119 and perform the client-side rendering test using known map data and the server generated reference data, as described further below.

In some implementations, server device 110 can include logging server 110. For example, logging server 110 can be a software server that receives and logs client-side rendering test results from client devices. The test results logged by logging server 120 can be analyzed to determine the client-side rendering capabilities of various client device hardware and software configurations. The data collected by logging server 120 is described further below.

In some implementations, server device 110 can include test data recorder 122. For example, test data recorder 122 can be software module that records map test data in test data server 118. Test data recorder 122 can, for example, operate as a pass through for map data requests from rendering module 114 and map server 112. For example, when generating map test data 119, test module 116 can provide map configuration data to rendering module 114. The configuration data can include a location, zoom level, style, and/or other parameters for obtaining map data for the map data test. When rendering module 114 requests map data, rendering module 114 can make the requests to the data recorder module 122 which can then forward the requests to map server 112. When map server 112 sends back the map data to rendering module 114, test data recorder 122 can record the data by sending the data used for the map data test to test data server 118 to be stored as map test data 119, and then forward the response back to rendering module 114. After rendering module 114 renders a reference image based on the map data received from map server 112, test module 116 can send the reference image and the map configuration data to test data server 118 to be stored as map test data 119. For example, the map data used for the map data test run on server device 110 and the reference image generated from the map data can be stored in association with (e.g., mapped to, indexed by) the map configuration data.

In some implementations, system 100 can include user device 140. For example, user device 140 can be a computing device, such as a laptop computer, smartphone, tablet computer, wearable device, in-car navigation system, or any other computing device that renders images for presentation on a display device.

In some implementations, user device 140 can include map module 150. For example, map module 150 can be a software component of navigation application 142 (e.g., native application, web browser, web application, etc.) that is configured to manage and/or present maps on user device 140.

In some implementations, map module 150 can include rendering module 152. For example, rendering module 152 can have the same or similar features as rendering module 114 of server device 110. Rendering module 152 can be configured to render images using the GPU and/or CPU of user device 140. For example, rendering module 152 can be configured to render map images from map data received from map server 112 and/or test module 154.

In some implementations, map module 150 can include test module 154. For example, test module 154 can have the same or similar features as test module 116 of server device 110. Test module 154 can include primitives test data 156. Primitives test data 156 can be the same as or similar to primitives test data 117 on server device 110. As opposed to map test data 119 that is downloaded to user device 140 whenever a map data test is run by test module 154, primitives test data 156 can be configured and installed in map module 150 as part of test module 154 such that user device 140 does not have to separately download primitives test data 156 to perform a primitives rendering test of rendering module 152. In some implementations, test module 154 can be preconfigured with map configuration data for performing the map data test.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 2:
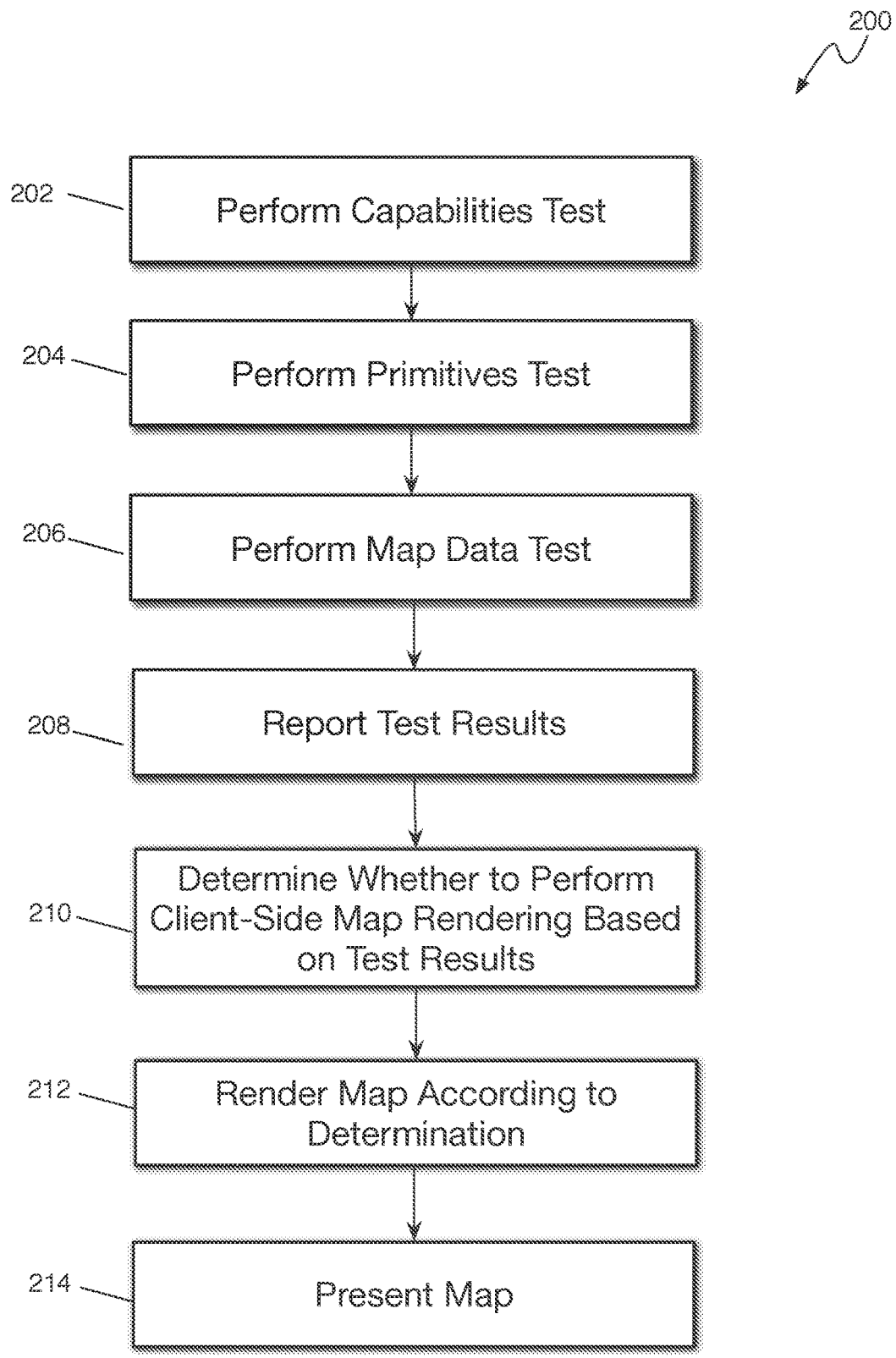
FIG. 2 is flow diagram of an example process for testing client-side rendering capabilities of a client device.

FIG. 2 is flow diagram of an example process 200 for testing client-side rendering capabilities of a client device. For example, process 200 can be performed by user device 140 to determine whether to render map data locally on user device 140 or request rendered map images from server device 110. Process 200 can be performed each time map module 150 is executed on user device 140. Process 200 can be performed when a change in the configuration of user device 140 is detected by test module 154. Process 200 can be performed periodically or in response to some other condition.

At step 202, user device 140 can perform a capabilities test. For example, test module 154 can perform a capabilities test with respect to map module 150. To perform the capabilities test, test module 154 can obtain from map module 150 information describing the configuration and/or capabilities of map module 150 and/or user device 140. The information can include, for example, the texture size limitations of the rendering module, the render buffer size, the maximum context size, the maximum amount of vertex data that can be used by the various GPU shaders used by the rendering module, the precision of the rendering module, what extensions are available for rendering, the GPU driver version used by the rendering module 152, the version of rendering module 152, and/or other information related to the rendering capabilities of rendering module 152, map module 150 and/or user device 140. These browser-reported capabilities can be stored by test module 154 and compared to minimum capability information to determine if the browser-reported capabilities indicate that map module 150, rendering module 152, and/or the GPU of user device 140 are capable of quickly and accurately rendering map data. In some implementations, when map module 150 and/or user device 140 passes the capabilities test, process 200 can skip steps 204 and/or 206 and continue to step 208. However, since browser-reported capabilities are often unreliable, in some implementations, process 200 can continue to step 204 when map module 150 and/or user device 140 passes or fails the capabilities test at step 202.

At step 204, user device 140 can perform a primitives test of the rendering capabilities of user device 140. For example, the primitives test can be a simplified GPU rendering test that tests the ability of the GPU and/or the GPU shaders to quickly and accurately render map elements, such as lines, labels, and polygons. As used throughout this specification, the term render includes the placing of graphical elements, objects, etc., in rendered data (e.g., image data, rendered context, etc.). The primitives test can include separate tests for each type of map element (e.g., lines, labels, polygons, etc.) that tests the abilities of specific shaders (e.g., line shader, label shader, polygon shader, etc.) used by rendering module 152 to render map data. In some implementations, test module 154 does not use map data to perform the primitives test. Instead, test module 154 uses preconfigured primitives test data that includes simplified line data, label data, polygon data, etc. (e.g., primitives), that tests the ability of the various shaders to render or place these graphical objects in a rendering context. The primitives test is described in greater detail below with reference to FIG. 3.

Based on the data rendered by rendering module 152, test module 154 can determine whether rendering module 152 passed or failed the primitives test. For example, test module 154 can determine that rendering module 152 generally failed the primitives test without determining whether specific shaders passed or failed the test. Test module 154 can determine that specific shaders used by rendering module 152 failed the primitives test while other shaders used by rendering module 152 passed the primitives test. Test module 154 can store data indicating the pass/fail results of the primitives test generally and/or with respect to specific shaders so that map module 150 can determine how and where to render map data.

For example, determining that certain shaders (e.g., line shader, label shader, etc.) passed the primitives test while other shaders (e.g., polygon shaders) failed the primitives test can allow user device 140 and/or map module 150 to be configured to perform partial client-side rendering of map data instead of relying on server device 110 to perform all of the rendering of map data. For example, map module 150 can be configured to request map images for the base map from rendering module 114 on server device 110 and map data for lines and labels from map server 112 on server device 110. Map module 150 can then present the base map using the base map images from server device 110 and render the map data related to lines and labels locally on user device 140. For example, rendering labels locally on user device 140 can allow map module 150 to render and control the presentation of map labels separately from the base map when user input is received that alters the presentation of the underlying base map so that the labels are oriented in such a way that they are easy to read by the user.

In some implementations, when map module 150 and/or user device 140 passes the primitives test, process 200 can skip step 206 and continue to step 208. However, in some implementations, process 200 can continue to step 206 when map module 150 and/or user device 140 passes or fails the capabilities test at step 202. For example, step 206 can be performed to confirm using real map data that rendering module 152, map module 150, and/or the GPU of user device 140 can render real map data quickly and accurately.

At step 206, user device 140 can perform a map data test. For example, step 206 can be performed each time that process 200 is performed. Step 206 can be performed occasionally (e.g., according to a time period, according to a testing interval, when the configuration of user device 140 is changed, etc.) as a confirmation of the primitives test results. For example, step 206 can be performed according to a testing interval that indicates that step 206 should be performed once for every 20 times process 200 is executed by user device 140.

To perform the map data test, test module 154 can obtain map test data 119 from test data server 118. Map test data 119 can include map data for testing the capabilities of rendering module 152 and expected results in the form of a map raster image that rendering module 152 should render based on the map data. If rendering module 152 can render map raster image based on the map test data that is similar enough to the expected results (e.g., based on a threshold value corresponding to a similarity metric) and within a threshold period of time, then test module 154 can determine that rendering module 152 has passed the map data test and can quickly and accurately render map images from map data. The map data test is described in further detail below with reference to FIG. 5. Test module 154 can store the pass or fail results of the map data test so that map module 150 can determine whether to render map data locally or request map raster images from server device 110.

At step 208, user device 140 can report test results to logging server 120. For example, test module 154 can report the capabilities of map module 150 and/or user device 140, as reported by map module 150. The capabilities information can include, for example, the texture size attribute of the rendering module, the rendering buffer size, the maximum context size, the maximum amount of vertex data that can be used by the various GPU shaders used by the rendering module, the precision of the rendering module, what extensions are available for rendering, the GPU driver version used by the rendering module 152, the version of rendering module 152, and/or other information related to the rendering capabilities of rendering module 152, map module 150 and/or user device 140. Test module 154 can report whether these capabilities pass or fail the capabilities test described above.

Test module 154 can report primitives test results. For example, when the primitives test is performed, test module 154 can report whether rendering module 152 generally passed the primitives test. Test module 154 can report whether specific shaders used by rendering module 152 pass or fail their respective primitives tests. For example, test module 152 can report individual pass/fail results for line shader, label shader, polygon shader, and/or other shaders used by rendering module 152 to render these graphical objects on a map image.

Test module 154 can report map data test results. For example, when the map data test is performed, test module 154 can measure the similarity between the map image generated by rendering module 152 from the map test data and the expected map image received from server device 110. If the rendered image and the expected image are similar enough (e.g., within a threshold similarity), then test module 154 can determine that rendering module 152 has passed the map data test. If the rendered image and the expected image are not similar enough (e.g., not within a threshold similarity), then test module 154 can determine that rendering module 152 has failed the map data test. Test module 154 can report the pass/fail result of the map data test and/or the similarity measurement to test data server 118.

The test results reported to logging server 120 can be analyzed to determine client device configurations that are capable of performing client-side rendering of map data. For example, the test results reported to logging server can be analyzed to determine that a client device is less capable than reported by the client's map module, more capable than reported by the client's map module, or that the reported capabilities match the actual capabilities of the user device.

The test results reported to logging server 120 can be analyzed to improve the client-side rendering tests and/or test data. For example, by analyzing the test results with respect to client device reported capabilities, the system can determine which reported capabilities can accurately discriminate incapable clients. As confidence increases that a client device that reports certain capabilities is actually capable of client-side rendering, the need for frequently performing the primitives test and/or the map data test for these devices may decrease. By relying on reported capabilities and performing the primitives test and/or map data test less frequently, the determination of whether to perform client-side rendering can be accomplished more quickly and with fewer computing resources (e.g., energy, processing cycles, memory, network bandwidth, etc.) consumed. Thus, the system can correlate reported capabilities with actual capabilities and adapt the testing mechanism to more efficiently determine which devices are capable of performing client-side rendering.

In some implementations, test module 154 will report all of the data needed to reproduce a test to logging server 120. For example, test module 154 can report the input data (e.g., map test data, primitives test data, etc.) provided to rendering module 152, the images rendered by rendering module 152, the reference data used by test module 154 used to determine the results of the tests, the amount of time it took rendering module 152 to render the images, and/or any other data that was used in or generated by any of the client-side rendering tests described herein.

At step 210, user device 140 can determine whether to perform client-side map rendering based on the test results. For example, the capabilities test, the primitives test, and the map data test can form a hierarchy of tests such that the primitives test results override the capabilities test results, and the map data test results override the primitives test results. For example, if user device 140 fails the capabilities test but passes the primitives test, map module 150 can determine that (at least some) map data should be rendered at user device 140 instead of rendering the map data at server device 110. However, if user device 140 passes the primitives test but fails the map data test, then map module 150 can determine that user device 140 (e.g., the GPU of user device 140) is not capable of client-side rendering of map data.

At step 212, user device 140 can render map data according to the determination made at step 210. For example, when a user of user device 140 provides input indicating that map module 150 should present a map of a geographic region, map module 150 can determine whether to render the map locally on user device 140 or whether to request map images from server device 110. Map module 150 can determine whether to perform client-side rendering of map data based on the test results generated and stored by test module 154. For example, when the capabilities test results, primitives test results, and/or map data test results indicate that rendering module 152 is capable of rendering map data using the GPU of user device 140, map module 150 can render map data received from map server 112 into map images using the GPU of user device 140. However, when the capabilities test results, primitives test results, and/or map data test results indicate that rendering module 152 is not capable of rendering map data using the GPU of user device 140, map module 150 can request map images from server device 110 (e.g., rendering module 114).

As described above, when test module 154 has tested whether specific GPU shaders can accurately and quickly render specific map elements (e.g., lines, labels, polygons, etc.), map module 150 can determine whether to perform partial map data rendering on user device 140. For example, when the primitives test results indicate that rendering module 152 on user device 140 is capable of accurately and quickly rendering labels but not polygons, map module 150 can request base map images from rendering module 114 on server device 110 and request map data corresponding to labels from map server 112 so that the map labels can be rendered locally on user device 140 by rendering module 152. Thus, map module 150 can selectively render certain map features locally on user device 140 based on the test results generated by test module 154.

At step 214, user device 140 can present the requested map. For example, after rendering the map data locally and/or requesting map images from server device 110, map module 150 can present the map images on a display of user device 140. For example, map module 150 can combine the map images rendered by server device 110 and/or rendering module 152 so that they present a coherent picture of the geographic region indicated by the user. Map module 150 can then present the map image or images on the display of user device 140.

Figure 3:
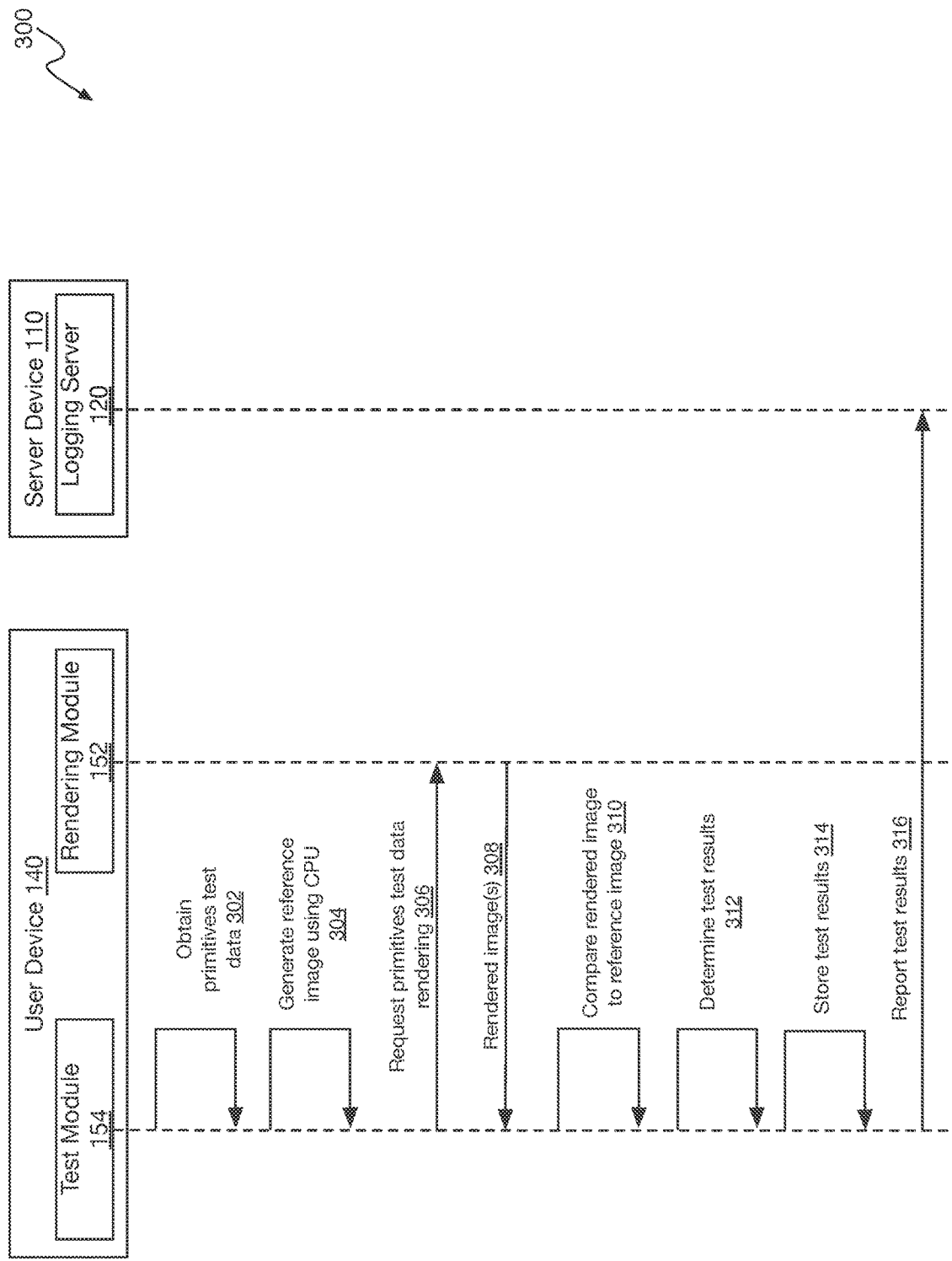
FIG. 3 is a process interaction diagram showing an example process for comparing the rendering behavior of a user device to expected behavior.

FIG. 3 is a process interaction diagram showing an example process 300 for comparing the rendering behavior of user device 140 to expected behavior. For example, process 300 can be performed by system 100 to determine whether user device 140 is capable of performing client-side rendering of map data. Process 300 can be performed at step 204 of process 200 described above.

At step 302, test module 154 can obtain primitives test data. For example, test module 154 can be preconfigured with test data that is configured to cause rendering module to generate simple shapes that are typically included in map data for generating map images. The test data can include graphical object data corresponding to labels (e.g., individual characters, strings of characters, etc.), lines, and/or polygons for example.

At step 304, test module 154 can emulate the correct behavior of the shader program using the CPU of user device 140. For example, test module 154 can generate the expected shader behavior with the test data of user device 140. The CPU can generate reference data that includes points (e.g., colored pixels) that correspond to the vertices of the lines, labels, and/or polygons configured in the test data. Test module 154 can, for example, generate separate reference data for each type of graphical object configured in the test data. Thus, test module 154 can cause the CPU of user device 140 to generate one set of reference data for the line test data, another set of reference data for the label test data, and yet another set of reference data for the polygon test data.

At step 306, test module 154 can request that rendering module 152 render the primitives test data. For example, test module 154 can send the primitives test data to rendering module 152 so that rendering module 152 can use various GPU shaders to render (e.g., place) the graphical objects configured in the primitives test data. Rendering module 152 can use the GPU and/or GPU shaders to generate different rendered data (e.g., rendering context data, rendered data, etc.) for each graphical object configured in the primitives test data. Thus, rendering module 152 can cause the GPU of user device 140 to generate one set of rendered data for the line test data, another set of rendered data for the label test data, and yet another set of rendered data for the polygon test data. Thus, test module 154 can test the ability of rendering module 152 to render each graphical object separately and/or individually.

At step 308, test module 154 can receive the rendered data from rendering module 152. For example, after each set of rendered data is generated by the GPU of user device 140, rendering module 152 can return the rendered data to test module 154. When the rendered data is received, test module 154 can determine how long it took for rendering module 152 to generate each set of rendered data. For example, rendering module 152 can report to test module 154 how long it took (e.g., rendering time) for the rendering module 152 to render the rendered data when sending the rendered images at step 308.

At step 310, test module 154 can compare the rendered data to the reference data. For example, test module 154 can perform a pixel comparison of the rendered data generated by the GPU and the reference data generated by the CPU of user device 140 to determine whether the GPU is capable of accurately rendering data based on the primitives test data, as illustrated by FIG. 4.

Figure 4:
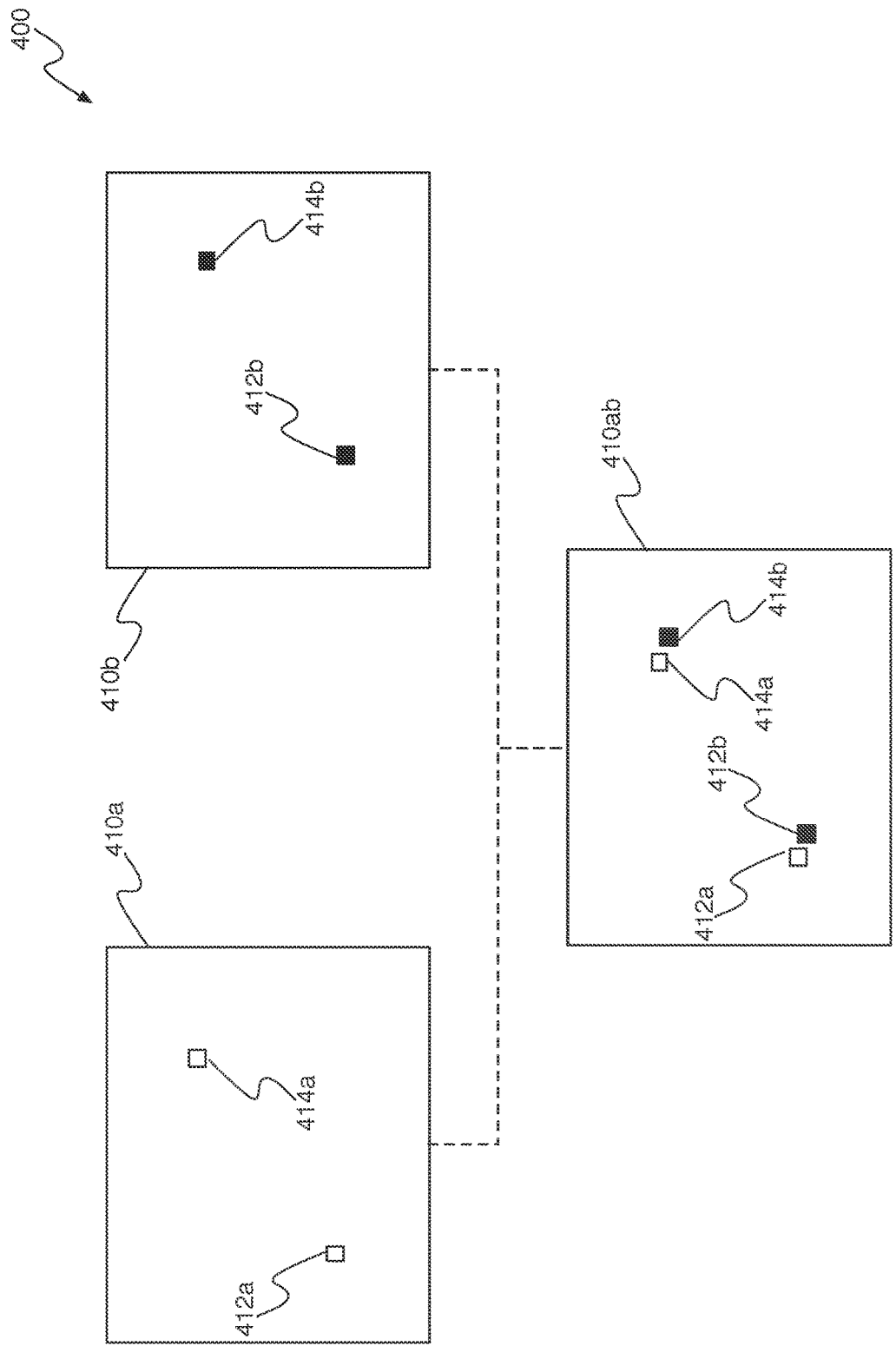
FIG. 4 is a conceptual illustration of how to compare the rendering behavior of a user device to expected behavior.

FIG. 4 is a conceptual illustration 400 of how test module 154 can compare the rendering behavior of a user device to expected behavior. The example of FIG. 4 illustrates (e.g., using images as representations of rendered data) comparing the vertices of a line graphical object as rendered by the CPU and GPU of user device 140, however, similar comparisons can be performed to determine the rendering accuracy of the GPU for other graphical objects, such as labels and polygons. The reference data rendered by the CPU is used as a reference for the test because the performance and behavior of the CPU is known (e.g., the CPU is known to render accurate image data).

For example, when reference data 410a is rendered by the CPU of user device 140, reference data 410a can include line vertex pixel 412a (e.g., corresponding to one end of the test data line) and/or line vertex pixel 414a (e.g. corresponding to the other end of the test data line). For example, vertex pixel 412a and vertex pixel 414a can have corresponding pixel data (e.g., color data) that distinguishes the pixels from other non-vertex pixels in reference image 410a.

Similarly, when rendered data 410b is rendered by the GPU (e.g., rendering module 152) of user device 140, rendered data 410b can include line vertex pixel 412b (e.g., corresponding to one end of the test data line) and/or line vertex pixel 414b (e.g. corresponding to the other end of the test data line). For example, vertex pixel 412b and vertex pixel 414b can have corresponding pixel data (e.g., color data) that distinguishes the pixels from other non-vertex pixels in reference image 410b.

Since both reference data 410a and rendered data 410b were generated using the same line object test data, vertex pixel 412a can correspond to vertex pixel 412b and vertex pixel 414a can correspond to vertex pixel 414b. If rendering module 152 is capable of accurately rendering image data based on the primitives test data, the locations of vertex pixels 412b and 414b in rendered data 410b should be the same as or near (e.g., within a threshold distance of) the respective locations of corresponding vertex pixels 412 and 412b in reference data 410a.

In some implementations, test module 154 can compare reference data 410a and rendered data 410b to determine whether rendered data 410b was accurately rendered by rendering module 152. For example, image 410ab represents rendered data 410b overlaid on reference data 410a to illustrate the difference in locations of vertex pixels 412a/b and 414a/b. To compare the images, test module 154 can determine the locations of vertex pixels 412a and 414a in reference data 410a. Test module 154 can determine the locations of vertex pixels 412b and 414b in reference data 410b. Test module 154 can determine the distance between corresponding vertex pixels 412a and 412b. If the distance between corresponding vertex pixels is less than a threshold distance (e.g., one pixel, two pixels, etc.), then test module 154 can determine that rendering module 152, and correspondingly the GPU of user device 140, is capable of accurately rendering (e.g., placing) the test graphical object (e.g., lines). If the distance between corresponding vertex pixels is greater than a threshold distance (e.g., one pixel, two pixels, etc.), then test module 154 can determine that rendering module 152, and correspondingly the GPU of user device 140, is not capable of accurately rendering the test graphical object (e.g., lines). The rendering of images and comparison of images and vertex pixels can be performed for each test graphical object (e.g., lines, labels, polygons, etc.) in the primitives test data.

Returning to FIG. 3, at step 312, test module 154 can determine the results of the primitives test. For example, test module 154 can determine based on the comparison(s) done at step 310 whether rendering module is able to accurately render (e.g., place) each type of graphical object (e.g., primitive) in the primitives test data. As described above, test module 154 has at this point also collected data indicating how fast rendering module 152 can render each type of graphical object in the primitives test data. Test module 154 can determine whether rendering module 152 has passed or failed the primitives test based on the image comparison and the time it took for rendering module 152 to render each type of graphical object in the primitives test data. For example, rendering module 152 may be able to accurately render line graphical objects but may not be able to accurately render polygon graphical objects. Thus, test module 154 can determine that rendering module 152 passed the line test but failed the polygon test. As another example, rendering module 152 may be able to accurately render both line graphical objects and polygon graphical objects. However, if rendering module 152 took more than a threshold amount of time (e.g., 0.5 seconds, 1 second, etc.) to render the polygon data, test module 154 can determine that rendering module 152 has failed the polygon test. Thus, in some implementations, test module 154 can determine whether rendering module 152 has passed or failed the rendering test for each type of graphical object in the primitives test data. In some implementations, test module 154 can determine whether rendering module 152 generally passed or failed the primitives test. For example, if rendering module 152 failed the rendering test for any of the graphical objects in the primitives test data, test module 154 can determine that rendering module 152 has failed the primitives test.

At step 314, test module 154 can store the primitives test results. For example, test module 154 can store on user device 140 the results of the primitives test of rendering module 152, which may include test results for individual types of graphical objects and/or overall (e.g., general) test results for the primitives test. Test module 154 can store the primitives test results so that the test results are accessible to map module 150 on user device 140. As described above, map module 150 can use the primitives test results to determine whether to perform client-side rendering of map data on user device 140 or whether to request rendered map images from server device 110.

At step 316, test module 154 can report the primitives test results to logging server 120. For example, test module 154 can send the results of the primitives test of rendering module 152 to logging server 120. The reported primitives test results can include test results for individual types of graphical objects and/or overall (e.g., general) test results for the primitives test.

Figure 5:
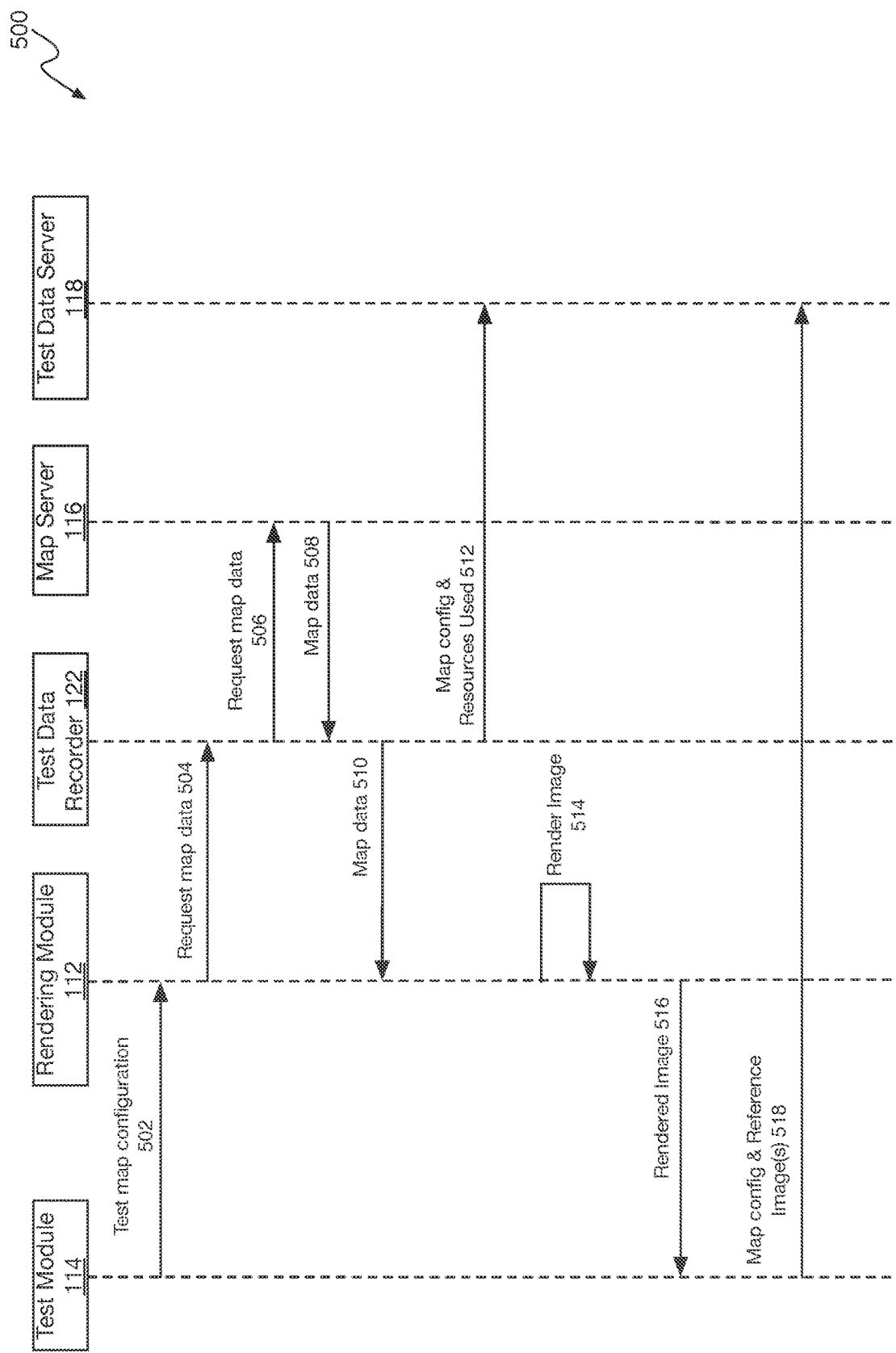
FIG. 5 is a process interaction diagram showing an example process for generating test data for performing the map data test for testing client-side rendering capabilities of a user device.

FIG. 5 is a process interaction diagram showing an example process 500 for generating test data for performing the map data test for testing client-side rendering capabilities of user device 140. For example, process 500 can be performed by system 100 to generate map test data for testing the client-side rendering capabilities of a client device, such as user device 140. Rendering module 152 on user device 140 can, for example, obtain the map test data from test data server 118 so that the map data test can be performed on user device 140.

At step 502, test module 114 can send map configuration data for the map data test to rendering module 112. For example, the map configuration data can specify a location, zoom level, style, and/or other parameters for the map data to be requested from map server 116 by rendering module 112. For example, the map configuration data can specify a location corresponding to a geographic region that includes a representation of each of the various map features (e.g., map assets, vector tiles, icons, shields, etc.) that a client device may be required to render if or when client-side rendering of map data is performed by a client device. By selecting a geographic region that includes assets representing a wide variety of map features as the basis for the map test data, test module 114 can ensure that the rendering module (e.g., GPU) on the client device is sufficiently tested when a map data test is performed on the client device.

At step 504, rendering module 112 can send a map data request to test data recorder 116. For example, the map data request can include any of the requests that the rendering module would normally send to map server 116 (e.g., icons, images, vector tiles, etc.) as necessary to render a map based on the test map configuration 502. For example, rendering module 112 can send portions (e.g., less than all) or all of the map configuration data received from test module 114 to test data recorder 116. Test data recorder 116 can act as a pass through for map data requests and map data sent between rendering module 112 and map server 116. Map data is passed through test data recorder 116 so that test data recorder can record the map data and/or other resources used for preparing the map data test in test data server 118, as described further below.

At step 506, test data recorder 116 can request map data from map server 116. For example, test data recorder 116 can forward the map data request received from rendering module 112 to map server 116. When forwarding the request, test data recorder 116 can store the map configuration data received in the request.

At step 508, test data recorder 116 can receive the requested map data from map server 116. For example, the map data can include map assets, such as vector tiles, icons, shields, labels, etc.) for generating a map image for the requested geographic region. Test data recorder 116 can send the map data to rendering module 112 on server device 110, at step 510.

At step 512, test data recorder 116 can send the map data received at step 508 and the map configuration data received at step 504 to test data server 118. For example, test data server 118 can store the map data in association with the map configuration data so that the map data can be found (e.g., accessed, indexed, located, etc.) based on the map configuration data.

At step 514, rendering module 112 can render a map image based on the map data received at step 510. For example, in response to receiving the map data, rendering module 112 can render the map data into a corresponding map image. For example, rendering module 112 can be a separate (e.g., different) instance of the same rendering module software (e.g., library) that is executed on client devices. Because the rendering module software is the same on both server device 110 and client device (e.g., user device 140) and because rendering module 112 works deterministically (e.g., always loads the same map data for a map configuration, always places map features in the same location for a map configuration), the differences in resulting images can be attributed to the differences in hardware and/or software configuration between server device 110 and user device 140. When executed on server device 110, rendering module 112 will typically have greater resources (e.g., memory, processing power, etc.) and will, therefore, be able to render map data into map raster images very accurately. Thus, when rendering module 112 on server device 110 renders a map raster image based on the map data received from test module 114, the map raster image is an accurate rendering of the map data. When the rendering module of user device 140 is later tested using the same map data, any differences between the image (e.g., reference image, expected image) generated by server 110 and an image rendered by user device 140 can be attributed to a rendering error (e.g., failure) at user device 140. Thus, the rendering capabilities of user device 140 can be tested by comparing the image rendered by user device 140 to the expected image rendered by server device 110.

At step 516, test module 114 can receive the map image rendered by rendering module 112. For example, after rendering module 112 renders the map image based on the map data received from map server 116, rendering module 112 can send the rendered map image to test module 114.

At step 518, test module 114 can send the map configuration data and the rendered image (e.g., reference image) as test data on test data server 118. For example, when test data server 118 receives the reference image, test data server 118 can store the reference image with the map data in associated with the map configuration data received at step 512. Test module 114 can then make the map test data available for distribution to client devices (e.g., user device 140).

Figure 6:
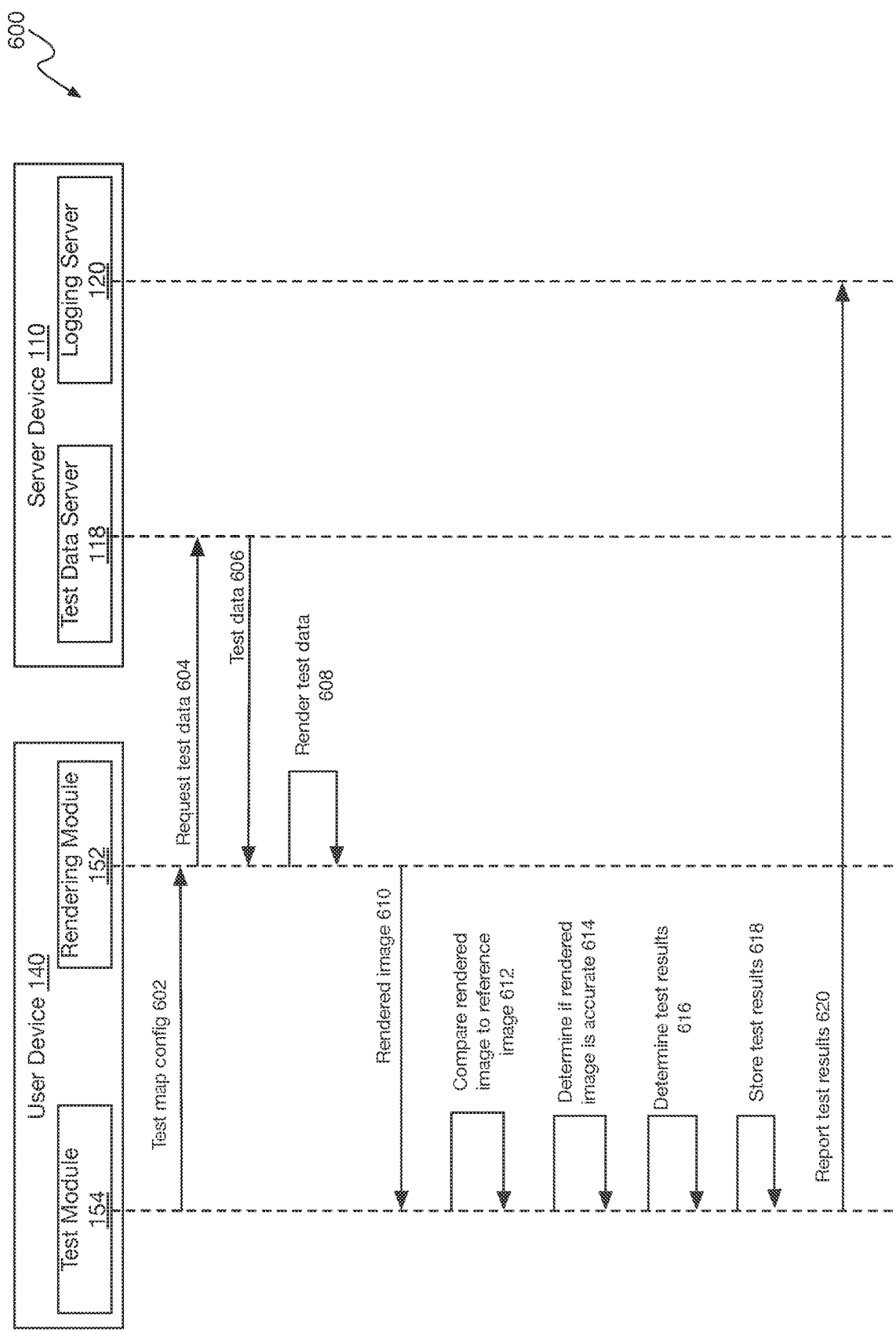
FIG. 6 is a process interaction diagram showing an example process for performing the map data test for testing client-side rendering capabilities of a user device.

FIG. 6 is a process interaction diagram showing an example process 600 for performing the map data test for testing client-side rendering capabilities of user device 140. For example, process 600 can be performed by system 100 to determine whether user device 140 is capable of performing client-side rendering of map data. Process 600 can be performed at step 206 of process 200 described above.

At step 602, test module 154 on user device 140 can send map configuration data for the map data test to rendering module 152. For example, this can be the same map configuration data used on server device 110 to generate the map test data stored in test data server 118.

At step 604, rendering module 152 can request map test data from test data server 118 on server device 110. For example, test module 154 can request from test data server 118 the map test data associated with the map configuration data received from test module 152 and generated by test module 114 on server device 110, as described above with reference to process 500 of FIG. 5.

At step 606, test module 154 can receive the map test data from test data server 118. For example, the map test data can include map data and a reference image (e.g., expected map image) corresponding to the map configuration data and generated by rendering module 112 on server device 110. In some implementations, the map test data can include information indicating a threshold amount of time within which a tested rendering module must be able to render the map data into a map image. This threshold amount of time can be preconfigured. This threshold amount of time can be based on the amount of time it took server device 110 to render the same map data into the reference image.

At step 608, rendering module 152 can render the map test data into a map image. For example, rendering module 152 can render the map data from the map test data into a map image. For example, rendering module 152 can render the map data into the map image using the GPU of user device 140.

At step 610, test module 154 can receive the rendered image from rendering module 152. For example, after rendering the map data into the map image, rendering module 152 can send the rendered map image to test module 154. In some implementations, rendering module 152 can determine how fast rendering module 152 rendered the map data into the rendered image and send information indicating the amount of time it took to render the image to test module 152 at step 610. Test module 154 can store the amount of time so that test module 154 can later determine whether rendering module 152 and/or user device 140 passed the map data test.

At step 612, test module 154 can compare the rendered image to the reference image. For example, test module 154 can calculate the similarity between the image rendered by rendering module 152 and the reference image rendered by server device 110 to generate a similarity measurement value (e.g., similarity score). In some implementations, before calculating the similarity between the rendered image and the reference image, test module 154 can convert both images into greyscale images. Test module 154 can calculate the similarity between the images using any of a number of well-known techniques to generate the similarity score. The similarity score can be a numerical representation of how similar the two images are. In some implementations, the higher the similarity score, the more similar the images. In some implementations, the lower the similarity score, the more similar the images.

At step 614, test module 154 can determine if the rendered image is accurate based on the similarity score. For example, the similarity score generated at step 610 can be compared to a threshold similarity score to determine whether the rendered image is accurate enough (e.g., close enough to the reference image) to determine that rendering module 152 is capable of accurately rendering map images from map data. For example, if the similarity score is greater than (or less than) the threshold similarity score, test module 154 can determine that rendering module 152 is capable of accurately rendering map images from map data.

At step 616, test module 154 can determine the results of the map data test. For example, the results of the map data test depend on whether rendering module 152 can accurately and quickly render map data into a map image. If the map image is not accurate, as indicated by the similarity score, then test module 154 can determine that rendering module 152 has failed the map data test. However, if test module 154 determines that rendering module 152 can generate accurate map images, rendering module 152 can still fail the map data test if test module 154 determines that rendering module 152 renders the map images too slowly (e.g., takes longer than a threshold amount of time). Thus, test module 154 may only determine that rendering module 152 passed the map data test when the rendered image is accurate (e.g., the similarity score is greater or less than the threshold similarity score) and when the rendering process is performed fast enough. For example, test module 154 can determine that rendering module 152 performed the rendering process fast enough when the amount of time determined at step 608 is less than the threshold amount of time for rendering, as indicated in the map test data.

At step 618, test module 154 can store the test results. For example, test module 154 can store test results indicating whether the map data was accurately rendered into a map image by rendering module 152. Test module 154 can store test results indicating the amount of time it took for rendering module 152 to render the map data into the map image. Test module 154 can store test results indicating whether rendering module 152 passed or failed the map data test.

At step 620, test module 154 can report the map data test results to logging server 120. For example, when the test results are received, logging server 120 can store the test results for later analysis, as described above.

Figure 7:
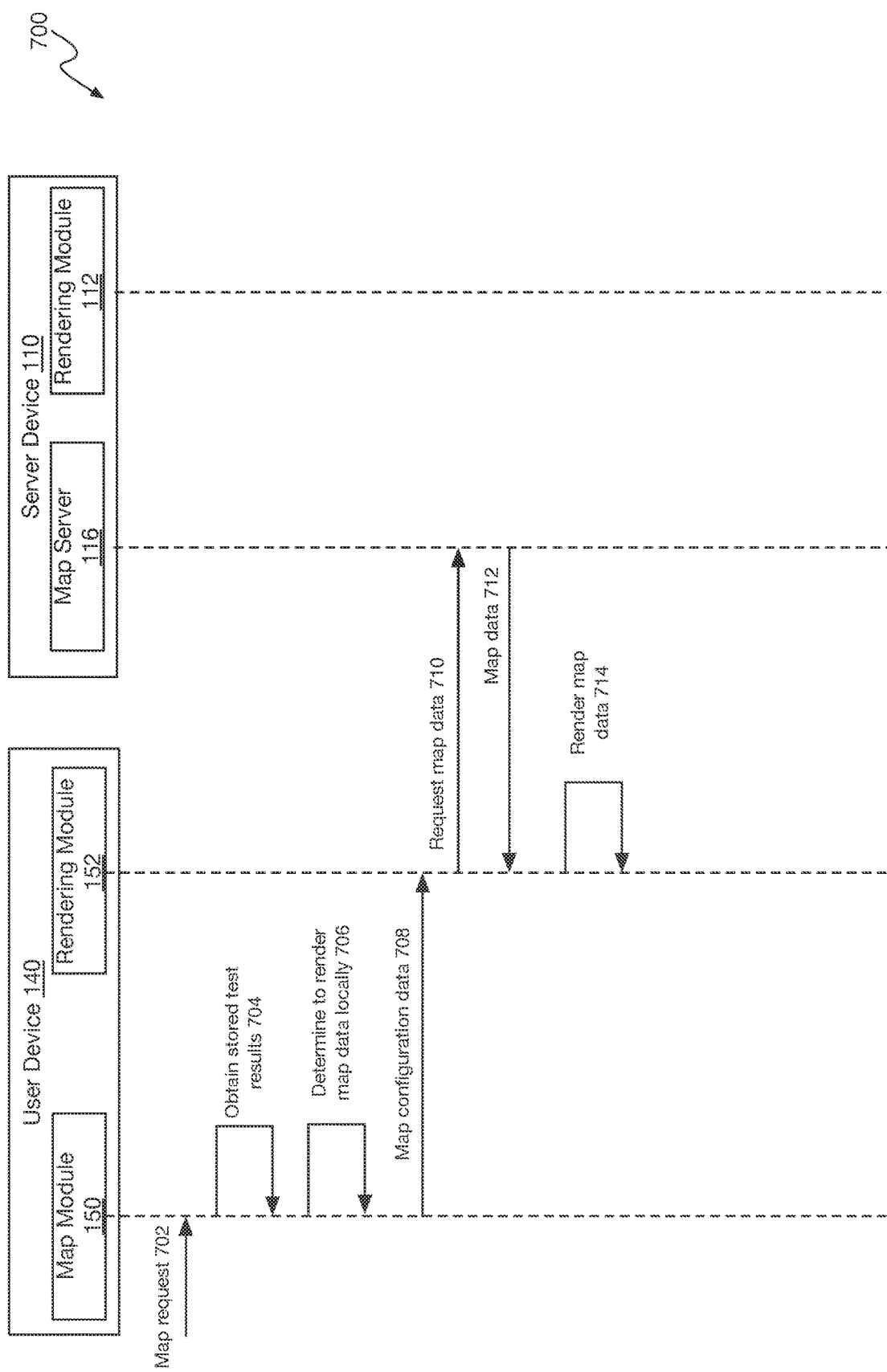
FIG. 7 is a process interaction diagram showing an example process for performing client-side rendering of map data at a user device.

FIG. 7 is a process interaction diagram showing an example process 700 for performing client-side rendering of map data at user device 140. Process 700 can begin at step 702 when map module 150 on user device 140 receives a request to present a map on a display of user device 140. For example, the request can be generated in response to receiving user input specifying a geographic region or location for which to present a map. The request can include map configuration data that includes a location, zoom level, style, and/or other parameters for obtaining map data and/or a map image for the requested geographic region.

At step 704, map module 150 can obtain stored client-side rendering test results, if present from a previous test. For example, in response to receiving the map request at step 704, map module 150 can obtain test results generated and stored on user device 140 by test module 154, as described above.

At step 706, map module 150 can determine that map data should be rendered locally on user device 140. For example, map module 150 can analyze the test results obtained at step 704 and determine that at least some map data should be rendered locally on user device 140. For example, when the obtained test results indicate that user device 140 and/or rendering module 152 passed the primitives test and the map data test, then map module 150 can determine that map data should be rendered locally on user device 140 by rendering module 152. However, when the obtained test results indicate that user device 140 and/or rendering module 152 only passed one or more of the graphical object rendering tests (e.g., line test, label test, polygon test, etc.) as part of the primitives test, then map module 150 can determine that client-side rendering should only be performed on user device 140 for the map data corresponding to the graphical object rendering tests passed by rendering module 152. For example, if user device 140 passed the line rendering test and the label rendering test, then map module 140 can determine that the base map image for the requested map should be requested from server device 110, while labels should be rendered locally by rendering module 152 on user device 140. Thus, map module 150 can determine that all of the map data corresponding to the requested geographic region should be rendered by rendering module 152 or map module 150 can determine that only part of the map data corresponding to the requested geographic regions should be rendered by rendering module 152 on user device 140.

At step 708, map module 150 can send map configuration data for the requested geographic region to rendering module 152. For example, map module 150 can send map configuration data for the requested geographic region to rendering module 152 in a request to render a map for the requested geographic region.

At step 710, rendering module 152 can request the map data corresponding to the requested geographic region. For example, when map module 150 has determined that all of the map data should be rendered by user device 140, rendering module 152 can request all of the map data for the requested geographic region. When map module 150 has determined that only some of the map data (e.g., certain layers, features, labels, etc.) should be rendered by user device 140 and map images should be requested for other map data (e.g., certain layers, features, etc.), rendering module 152 can request the specific portions of the map data for the requested geographic region that will be rendered by rendering module 152 on user device 140 and request map images for the other portions of the map data from server device 110, as described with reference to FIG. 8. The map configuration data received at step 708 can specify what map data (e.g., all map data, specific portions, specific layers, specific features, etc.) should be requested from map server 116.

At step 712, rendering module 152 can receive the requested map data from map server 116. For example, the map data can include map assets, such as vector tiles, icons, shields, labels, or other map elements that can be rendered into a map image.

At step 714, rendering module 152 can render the received map data into a map image. For example, rendering module 152 can render map images corresponding to the map data received at step 712. Thus, rendering module 152 can render into map images all of the map data for the requested geographic region, or only certain map elements (e.g., map assets, layers, features, labels, etc.).

For example, when rendering module 152 renders map images for all of the map data, rendering module 152 can combine, if necessary, and present the map images on the display of user device 140. When rendering module 152 renders map images only for certain map elements, rendering module 152 can combine the locally generated map images with map images (e.g., a base map image) received from server device 110 and present the combined map image on a display of user device 140. Thus, rendering module 152 can perform complete and/or selective rendering of map data on user device 140.

Figure 8:
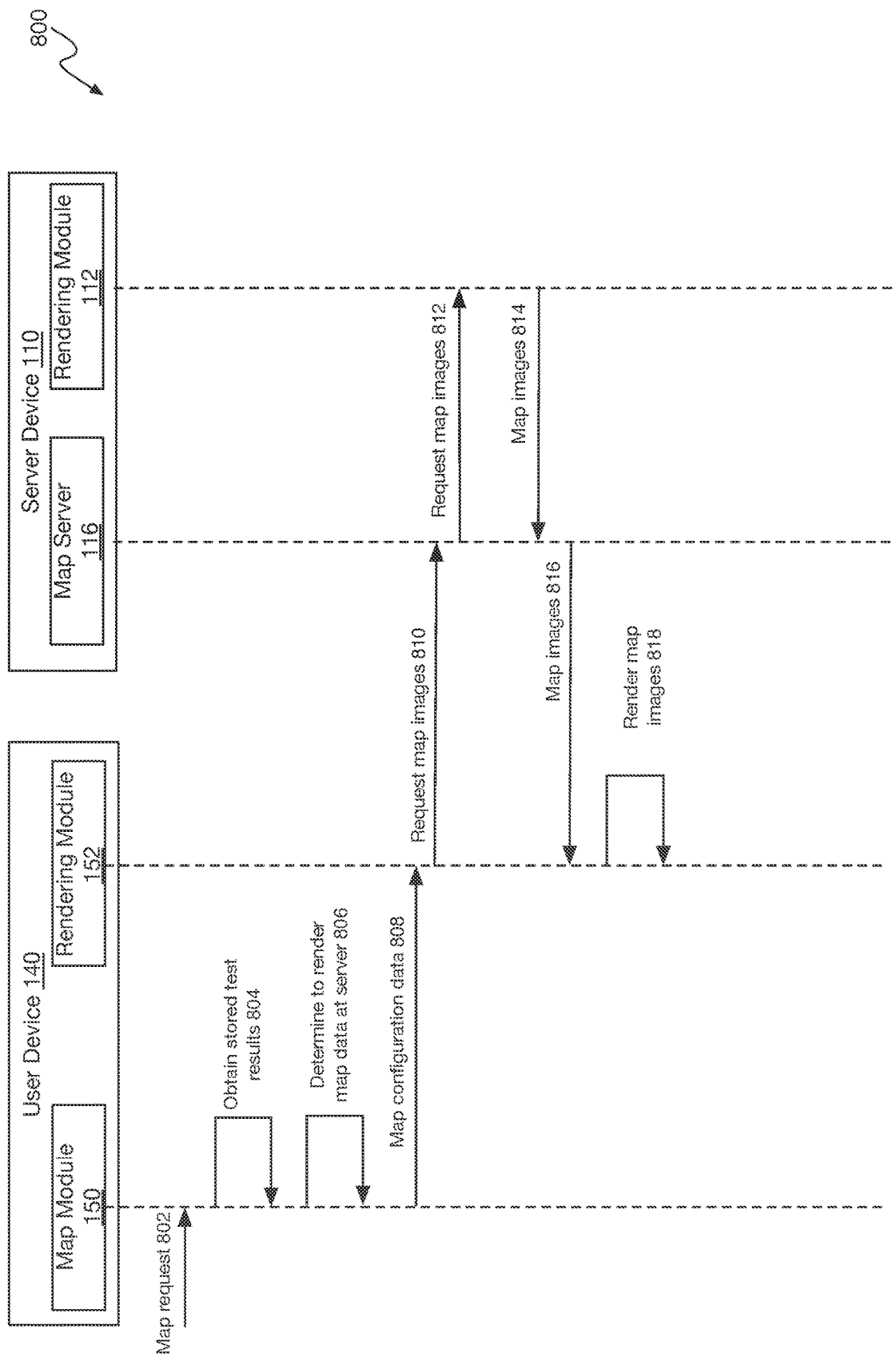
FIG. 8 is a process interaction diagram showing an example process for obtaining map data rendered by a server device.

FIG. 8 is a process interaction diagram showing an example process 800 for obtaining map data rendered by server device 110. Process 800 can begin at step 802 when map module 150 receives a request to present a map of a geographic region. For example, the request can be received in response to user input to map module 150. The request can include map configuration data, as described above.

At step 804, map module 150 can obtain stored client-side rendering test results. For example, in response to receiving the map request at step 704, map module 150 can obtain test results generated and stored on user device 140 by test module 154, as described above.

At step 806, map module 150 can determine that map data should be rendered by server device 110. For example, map module 150 can analyze the test results obtained at step 804 and determine that at least some map data should be rendered by server device 110. For example, when the obtained test results indicate that user device 140 and/or rendering module 152 completely failed the primitives test and/or the map data test, then map module 150 can determine that map data should be rendered by server device 110. However, when the obtained test results indicate that user device 140 and/or rendering module 152 failed less than all of the graphical object rendering tests (e.g., line test, label test, polygon test, etc.) as part of the primitives test, then map module 150 can determine that client-side rendering should be performed on user device 140 for the map data corresponding to the graphical object rendering tests passed by rendering module 152. For example, if user device 140 passed the line rendering test and the label rendering test, then map module 140 can determine that the base map image for the requested map should be requested from server device 110, while labels should be rendered locally by rendering module 152 on user device 140. Thus, map module 150 can determine that all of the map data corresponding to the requested geographic region should be rendered by server device 110 or map module 150 can determine that only part of the map data corresponding to the requested geographic regions should be rendered by server device 110.

At step 808, map module 150 can send the map configuration data for the requested geographic region to rendering module 152. For example, the map configuration data can specify which map images to request from map server 116.

At step 810, rendering module 152 can request map images from map server 116 on server device 110. For example, rendering module 152 can request map images for the entire geographic region indicated in the map request received at step 802. Rendering module 152 can request map images for the certain map features and/or layers (e.g., less than all of the map data) corresponding to the geographic region indicated in the map configuration data received at step 808.

At step 812, map server 116 can request map images from rendering module 112 on server device 110. For example, in response to receiving the map image request at step 808, map server 116 can request that rendering module 112 render the map images requested by map module 150. For example, map server 116 can send map data corresponding to the requested geographic region to rendering module 112. Rendering module 112 can render the requested map images based on the map data received from map server 116.

At step 814, rendering module 112 can send the rendered map images to map server 116. In response to receiving the map images, map server 116 can send the map images rendered by server device 110 to rendering module 152 on user device 140 at step 816.

At step 818, rendering module 152 can render the map images for display on user device 140. For example, when server device 110 renders map images for all of the map data for the requested geographic region, rendering module 152 can receive the map images from server device 110 and, if necessary, combine the map images into a single image for presentation on the display of user device 140. When server device 110 renders map images only for certain map elements (e.g., a base map image), rendering module 152 can combine the locally generated map images (e.g., map labels) with server generated map images (e.g., a base map image) received from server device 110 and present the combined map image on a display of user device 140. Thus, map module 150 can request that server device 110 render all map images for the selected geographic region or map module can request that server device 110 only render selected map images (e.g., map layers, map assets, map elements, etc.) for presentation on user device 140.

Although processes 700 and 800 are described above a separate processes, processes 700 and 800, or steps therein, can be combined to perform both client-side and server-side rendering of map data. Moreover, the processes of FIGS. 2-8, or the steps therein, can be combined, recombined, omitted, etc., to perform the various rendering tests individually or in different combinations. The results of the rendering tests can be used by system 100 to determine whether to perform client-side rendering, server-side rendering, or a combination thereof.

Privacy

The present disclosure recognizes that the use of personal information data and/or user device data (e.g., collectively, user data), in the present technology, can be used to the benefit of users. For example, the user data can be used to render maps and/or other graphical user interfaces more quickly, dynamically, and/or more efficiently. Further, other uses for personal information data that benefit the user are also contemplated by the present disclosure.

The present disclosure further contemplates that the entities responsible for the collection, analysis, disclosure, transfer, storage, or other use of user data will comply with well-established privacy policies and/or privacy practices. In particular, such entities should implement and consistently use privacy policies and practices that are generally recognized as meeting or exceeding industry or governmental requirements for maintaining personal information data private and secure. For example, user data from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the user data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, user data. That is, the present disclosure contemplates that hardware and/or software elements can be provided to prevent or block access to such user data. For example, the present technology can be configured to allow users to select to "opt in" or "opt out" of participation in the collection of user data during registration for services or operation of user devices. In another example, users can select not to provide location information, technical details regarding a user device, and/or capabilities of user devices. In yet another example, users can select to not provide precise location information, but permit the transfer of location zone information.

Example System Architecture

Figure 9:
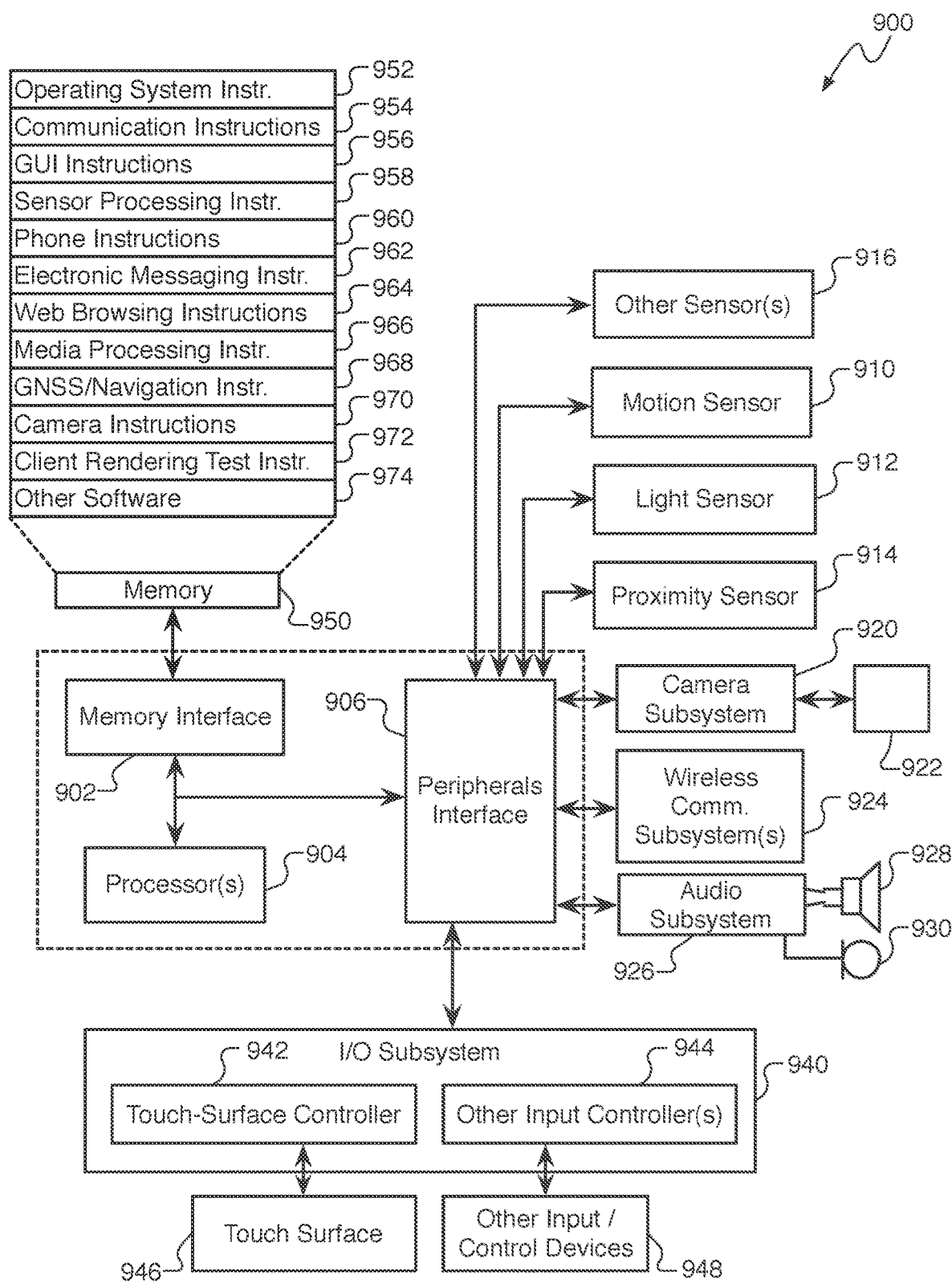
FIG. 9 is a block diagram of an example computing device that can implement the features and processes of FIGS. 1-8.

FIG. 9 is a block diagram of an example computing device 900 that can implement the features and processes of FIGS. 1-8. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™.

The memory interface 902 can be coupled to memory 950. The memory 950 can include high-speed randomaccess memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement the features for testing client-side rendering capabilities as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store other software instructions 972 to facilitate other processes and functions, such as the processes and functions for testing client-side rendering capabilities as described with reference to FIGS. 1-8.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

What is claimed is:

1. A method comprising:
conducting, by a client device, one or more rendering self-tests of rendering capabilities of the client device using test data that includes a plurality of test objects corresponding to a plurality of object types;
storing, by the client device, test results that indicate the outcome of the one or more rendering self-tests, the results including an indication of whether the client device is capable of rendering objects corresponding to each of the plurality of object types;
obtaining a first set of map data that includes a first plurality of map objects corresponding to at least two of the plurality of object types;
when the stored test results indicate that the client device is capable of rendering map objects of a first object type and not a second object type:
receiving, from a map server, server-rendered map objects of the second object type,
rendering, by the client device, map objects of the first object type to generate client-rendered map objects, and
combining the server-rendered map objects and the client-rendered map objects into a first map presentation; and
when the stored test results indicate that the client device is capable of rendering all map objects included in the first set of map data:
rendering, by the client device, all map objects of the first plurality of map objects into a second map presentation.

2. The method of claim 1, further comprising:
receiving, by the client device, a map rendering request for rendering a map region;
identifying map configuration data associated with the map rendering request, wherein the map configuration data includes one or more of a location of the map region, a style associated with the map region, and a zoom level at which rendering of the map region is requested;
based on the map configuration data, identifying a second set of map data associated with a second plurality of map objects of the geographic region;
comparing the second set of map data to the test results;
determining, based on the comparison, that the client device can render a first map object of the second plurality of map objects and that the client device cannot render a second map object of the second plurality of map objects;
in response to the determination, requesting, from a server device, a first subset of the first set of map object data that is associated with the first map object; and
rendering the first map object based on the first subset received from the server device.

3. The method of claim 2, wherein the second plurality of map objects includes one or more of map assets, vector tiles, icons, and shields.

4. The method of claim 1, further comprising:
determining, by the client device, that the client device passes a first test of rendering a primitive map object;
determining, by the client device, that the client device fails a second test of rendering a base map object;
requesting map data from the server device for the primitive map object;
requesting a base map image corresponding to the base map object from the server device; and
generating a hybrid map presentation that includes a first image rendered by the client device to represent the primitive map object and includes the base map image requested from the server device.

5. The method of claim 4, wherein the primitive map object corresponds to one of a map line, a map polygon, and a map label.

6. The method of claim 1, further comprising:
determining that a third test of rendering one or more map objects satisfies a time threshold and an accuracy threshold; and in response to the determination, determining that the client device passes the third test.

7. The method of claim 6, further comprising:
determining that a fourth test of rendering one or more map objects satisfies the accuracy threshold and fails to satisfy the time threshold; and
in response to the determination, determining that the client device fails the fourth test.

8. A non-transitory computer readable medium including one or more sequences of instructions that, when executed by one or more processors of a client device, cause the processors to perform operations comprising:
conducting, by a client device, one or more rendering self-tests of rendering capabilities of the client device using test data that includes a plurality of test objects corresponding to a plurality of object types;
storing, by the client device, test results that indicate the outcome of the one or more rendering self-tests, the results including an indication of whether the client device is capable of rendering objects corresponding to each of the plurality of object types;
obtaining a first set of map data that includes a first plurality of map objects corresponding to at least two of the plurality of object types;
when the stored test results indicate that the client device is capable of rendering map objects of a first object type and not a second object type:
  receiving, from a map server, server-rendered map objects of the second object type,
  rendering, by the client device, map objects of the first object type to generate client-rendered map objects, and
  combining the server-rendered map objects and the client-rendered map objects into a first map presentation; and
when the stored test results indicate that the client device is capable of rendering all map objects included in the first set of map data:
  rendering, by the client device, all map objects of the first plurality of map objects into a second map presentation.

9. The non-transitory computer readable medium of claim 8, wherein the instructions cause the processors to perform operations comprising:
receiving, by the client device, a map rendering request for rendering a map region;
identifying map configuration data associated with the map rendering request, wherein the map configuration data includes one or more of a location of the map region, a style associated with the map region, and a zoom level at which rendering of the map region is requested;
based on the map configuration data, identifying a second set of map data associated with a second plurality of map objects of the geographic region;
comparing the second set of map data to the test results;
determining, based on the comparison, that the client device can render a first map object of the second plurality of map objects and that the client device cannot render a second map object of the second plurality of map objects;
in response to the determination, requesting, from a server device, a first subset of the first set of map object data that is associated with the first map object; and
rendering the first map object based on the first subset received from the server device.

10. The non-transitory computer readable medium of claim 8, wherein the second plurality of map objects includes one or more of map assets, vector tiles, icons, and shields.

11. The non-transitory computer readable medium of claim 8, wherein the instructions cause the processors to perform operations comprising:
determining, by the client device, that the client device passes a first test of rendering a primitive map object;
determining, by the client device, that the client device fails a second test of rendering a base map object;
requesting map data from the server device for the primitive map object;
requesting a base map image corresponding to the base map object from the server device; and
generating a hybrid map presentation that includes a first image rendered by the client device to represent the primitive map object and includes the base map image requested from the server device.

12. The non-transitory computer readable medium of claim 11, wherein the primitive map object corresponds to one of a map line, a map polygon, and a map label.

13. The non-transitory computer readable medium of claim 8, wherein the instructions cause the processors to perform operations comprising:
determining that a third test of rendering one or more map objects satisfies a time threshold and an accuracy threshold; and
in response to the determination, determining that the client device passes the third test.

14. The non-transitory computer readable medium of claim 8, wherein the instructions cause the processors to perform operations comprising:
determining that a fourth test of rendering one or more map objects satisfies the accuracy threshold and fails to satisfy the time threshold; and in response to the determination, determining that the client device fails the fourth test.

15. A system comprising:
one or more processors of a computing device; and
a non-transitory computer readable medium including one or more sequences of instructions that, when executed by the one or more processors, cause the processors to perform operations comprising:
  conducting, by a client device, one or more rendering self-tests of rendering capabilities of the client device using test data that includes a plurality of test objects corresponding to a plurality of object types;
  storing, by the client device, test results that indicate the outcome of the one or more rendering self-tests, the results including an indication of whether the client device is capable of rendering objects corresponding to each of the plurality of object types;
  obtaining a first set of map data that includes a first plurality of map objects corresponding to at least two of the plurality of object types;
  when the stored test results indicate that the client device is capable of rendering map objects of a first object type and not a second object type:
    receiving, from a map server, server-rendered map objects of the second object type,
    rendering, by the client device, map objects of the first object type to generate client-rendered map objects, and
    combining the server-rendered map objects and the client-rendered map objects into a first map presentation; and when the stored test results indicate that the client device is capable of rendering all map objects included in the first set of map data:
rendering, by the client device, all map objects of the first plurality of map objects into a second map presentation.

16. The system of claim 15, wherein the instructions cause the processors to perform operations comprising:
receiving, by the client device, a map rendering request for rendering a map region;
identifying map configuration data associated with the map rendering request, wherein the map configuration data includes one or more of a location of the map region, a style associated with the map region, and a zoom level at which rendering of the map region is requested;
based on the map configuration data, identifying a second set of map data associated with a second plurality of map objects of the geographic region;
comparing the second set of map data to the test results;
determining, based on the comparison, that the client device can render a first map object of the second plurality of map objects and that the client device cannot render a second map object of the second plurality of map objects;
in response to the determination, requesting, from a server device, a first subset of the first set of map object data that is associated with the first map object; and
rendering the first map object based on the first subset received from the server device.

17. The system of claim 15, wherein the instructions cause the processors to perform operations comprising:
determining, by the client device, that the client device passes a first test of rendering a primitive map object;
determining, by the client device, that the client device fails a second test of rendering a base map object;
requesting map data from the server device for the primitive map object;
requesting a base map image corresponding to the base map object from the server device; and
generating a hybrid map presentation that includes a first image rendered by the client device to represent the primitive map object and includes the base map image requested from the server device.

18. The system of claim 15, wherein the primitive map object corresponds to one of a map line, a map polygon, and a map label.

19. The system of claim 15, wherein the instructions cause the processors to perform operations comprising:
determining that a third test of rendering one or more map objects satisfies a time threshold and an accuracy threshold; and
in response to the determination, determining that the client device passes the third test.

20. The system of claim 15, wherein the instructions cause the processors to perform operations comprising:
determining that a fourth test of rendering one or more map objects satisfies the accuracy threshold and fails to satisfy the time threshold; and
in response to the determination, determining that the client device fails the fourth test.

* * * * *